United States Patent [19]

Bracke et al.

[11] 4,247,668

[45] Jan. 27, 1981

[54] PROCESS FOR PREPARING STYRENIC RESINS

[75] Inventors: William J. I. Bracke, Hamme; Emmanuel Lanza, Brussels, both of Belgium

[73] Assignee: Labofina S.A., Brussels, Belgium

[21] Appl. No.: 134,472

[22] Filed: Mar. 27, 1980

[51] Int. Cl.³ ............................................ C08F 257/02
[52] U.S. Cl. .................................. 525/313; 525/244; 525/263
[58] Field of Search ........................ 525/313, 244, 263

[56] References Cited

U.S. PATENT DOCUMENTS

| | | | |
|---|---|---|---|
| 3,538,194 | 11/1970 | Barrett et al. | 525/313 |
| 3,951,932 | 4/1976 | Coffey | 525/313 |

FOREIGN PATENT DOCUMENTS

| | | | |
|---|---|---|---|
| 565897 | 11/1958 | Canada | 525/313 |
| 710894 | 6/1965 | Canada | 525/313 |
| 757531 | 9/1956 | United Kingdom | 525/313 |

Primary Examiner—William F. Hamrock
Attorney, Agent, or Firm—M. Norwood Cheairs; Monty L. Ross

[57] ABSTRACT

An improved process for preparing rubber reinforced styrenic resins which are composite systems containing a copolymer of styrene and unsaturated nitrile together with copolymers of acrylates and conjugated diolefins.

15 Claims, No Drawings

PROCESS FOR PREPARING STYRENIC RESINS

TECHNICAL FIELD

The present invention relates to a new and improved process for preparing rubber reinforced styrenic resins, especially resins called ASA or ABSA which are composite systems containing a copolymer of styrene and unsaturated nitrile together with copolymers of acrylates and conjugated diolefins.

BACKGROUND OF THE INVENTION

A process for preparing the above-mentioned styrenic resins in its patent application Ser. No. 24,837 filed on Mar. 28, 1979 which is a continuation-in-part of patent application Ser. No. 916,576, now abandoned filed on June 19, 1978, which is a continuation-in-part of patent application Ser. No. 890,211, now abandoned filed on Mar. 27, 1978, has previously been disclosed in which the rubber is polymerized in situ. According to the earlier process, a monomer mixture capable of forming a rubbery polymer by polymerization is added to a rigid polymeric matrix, generally a styrene acrylonitrile or an acrylonitrile-butadiene-styrene resin, said monomer mixture comprising an alkyl ester of acrylic acid and a cross-linking agent, such as conjugated diolefins. In that process the monomer mixture is absorbed by the rigid polymeric matrix and is then suspension polymerized to form in situ a rubbery polymer dispersed in the polymeric matrix.

Although the above described process allows one to prepare ASA or ABSA resins having valuable physical properties, it has been found that the simultaneous introduction into the suspension of the acrylic monomer together with the crosslinking agent, i.e. the conjugated diolefin, can lead in some cases to a side reaction, with formation of a Diels-Adler addition product between the acrylic monomer and the conjugated diolefin. The presence of that addition compound in the final product can have a detrimental influence on the physical properties of the resin. On the other hand, it has also been noticed that during the absorption period, which is generally carried out in the absence of oxygen, some amount of acrylic monomer can polymerize because the temperature is relatively high during the absorption step. However, this high temperature is necessary to obtain a homogeneous distribution of the acrylic monomer into the polymeric matrix. The consequence of such a polymerization during the absorption step is the formation of a non-homogeneous rubbery copolymer, which does not contain unsaturated units distributed along the polymeric chain. However, the presence of the unsaturated units distributed along the polymeric chain is necessary to form cross-linked domains at the end of the reaction. Such an early polymerization can occur even if the acrylic monomer contains a usual polymerization inhibitor, such as hydroquinone methyl ether, which is generally added to avoid the polymerization during transport or storage of the monomer.

SUMMARY OF THE INVENTION

A new and improved process for preparing styrenic resins is disclosed herein which allows one of ordinary skill in the art to avoid the above cited drawbacks.

One object of the present invention is a new and improved process for preparing styrenic resins, especially the ASA or ABSA resins, according to which the rubbery copolymer formed in situ is a homogeneous polymer.

Another object of the present invention is a new and improved process for preparing styrenic resins, especially the ASA or ABSA resins, according to which the early polymerization of the acrylic monomer in the absorption step is avoided, and according to which the formation of the Diels-Adler addition compound between the acrylic monomer and the conjugated diolefin cross-linking agent is considerably reduced.

The process of the present invention for preparing rubber reinforced styrenic resins wherein the rubbery copolymer is formed in situ by suspension polymerization, comprises the steps of inroducing into a suspension of styrenic resin beads, under an oxygen free atmosphere, a polymerization inhibitor for an acrylic monomer, said inhibitor easily generating nitrogen oxides; introducing into said suspension an acrylic monomer selected from the group comprising the alkyl esters of acrylic acid whose alkyl radical contains at least 6 carbon atoms; carrying out the absorption of the acrylic monomer by the styrenic resin at a temperature ranging from about 110° to about 130° C. during a period of time sufficient to obtain a homogeneous distribution of the monomer in the styrenic resin; cooling the suspension to a temperature ranging from about 80° to about 100° C.; introducing into the suspension, during the cooling period, a decomposition agent of the polymerization inhibitor of the acrylic monomer; introducing into the suspension after the cooling period a free radical polymerization catalyst together with from about 20 to about 50% of a monomer capable of crosslinking the rubbery polymer, said introduction being carried out over a period ranging from about ½ to about 2 hours; introducing into the suspension the rest of the monomer capable of crosslinking the rubbery polymer, said introduction being carried out over a period ranging from about 4 to about 10 hours; and completing the suspension polymerization.

DETAILED DESCRIPTION OF THE PREFERRED EMBODIMENTS

The process of the present invention employs a suspension of styrenic resin beads generally selected from SAN resin, which is a styrene-acrylonitrile copolymer, or ABS resin, which is a styrene-butadiene-acrylonitrile copolymer wherein the butadiene content does not exceed about 8% by weight. These styrenic resin beads can be obtained from a previous suspension polymerization carried out under an oxygen free atmosphere. These styrenic resin beads can be directly used in the process of the present invention by permitting them to remain in suspension in the reactor under the same operating conditions. However, previously manufactured styrenic resin beads can be resuspended and in that case, the resuspended are subjected to a treatment for eliminating oxygen before continuing the process of the invention. Said treatment may be either chemical or physical. For example, chemical treatment can be accomplished with sodium dithionite; physical treatment can be accomplished by steam venting.

Before introducing the acrylic monomer into the suspension, the polymerization inhibitor for the acrylic monomer is first injected. While it is well known that acrylic monomer typically already contains a polymerization inhibitor, generally hydroquinone methyl ether (called hereafter MEHQ), it has been noticed that said inhibitor is ineffective, even if used at higher concentrations, to inhibit the polymerization of the acrylic monomer during the absorption period. This can be satisfactorily accomplished by introducing (concomitantly with MEHQ where it is present) another polymerization inhibitor capable of easily generating nitrogen oxides, and particularly NO.

The polymerization inhibitor is preferably one that is effective for the particular conditions to be used in the process of the invention. It will be readily appreciated that if the acrylic monomers must not polymerize during the absorption period, they must polymerize in a further step of the process. Therefore the polymerization inhibitor must easily be eliminated from the reaction mixture. For this reason, the inhibitor should be a water soluble compound, but it should be at the same time at least partly soluble in the organic phase, to inhibit the polymerization which occurs essentially in the organic phase. Moreover, said polymerization inhibitor should be capable of being eliminated without forming decomposition residues which could have a detrimental effect on the final product. The heavy inhibitor compounds well known in the art such as, for example, nitrosophenol and analogs, are therefore not recommended for use in the process of the invention because their elimination yields heavy decomposition residues.

Satisfactory inhibitors which fulfill the above conditions may be selected from the group comprising hydroxylamine, NO and the alkaline nitrites. Preferred inhibitors for use in the invention are the alkaline nitrites, and most preferably, sodium nitrite.

The amount of inhibitor which should be used to effectively inhibit the polymerization of the acrylic monomer during the absorption period depends on various factors such as the presence or not of a usual inhibitor such as MEHQ in said monomer, the sizes of the reactor, the duration of the absorption period and the temperature at which said absorption is carried out. Said amount increases with the duration of the absorption period and with the temperature. If large reactors are used, or if MEHQ is already present in the acrylic monomer, the amount of inhibitor to be used decreases.

The amount of inhibitor desirable to effectively inhibit the polymerization of the acrylic monomer generally ranges from about 100 to about 1500 ppm, based on the amount of acrylic monomer which is to be introduced into the reaction mixture. However, lower or higher amounts can also be used and such amounts can be easily determined by one skilled in the art for each particular case, taking into account the operating conditions.

The acrylic monomer is thereafter added to the suspension of styrenic resin beads and polymerization inhibitor during a period of time ranging from about 2 to about 6 hours, at a temperature ranging from about 110° to about 130° C., the absorption of said acrylic monomer by the styrenic resin being carried out during said period of time.

Applicant has unexpectedly found that a more homogeneous distribution of the acrylic monomer in the styrenic resin is achieved when heavier acrylic monomers are used. These acrylic monomers are alkyl esters of acrylic acid, generally alkyl esters whose alkyl radical contains at least 6 carbon atoms. A particularly preferred alkyl ester of acrylic acid is 2-ethylhexyl acrylate.

The amount of acrylic monomer introduced into the suspension depends on the properties desired for the final product. Generally the amount will range from about 20 to about 40% by weight, based on the weight of the styrenic resin.

After the introduction of the acrylic monomer, which constitutes the absorption period, the suspension mixture is cooled to a temperature ranging from about 80° to about 100° C. This cooling period may range from about ½ to about 1 hour.

This cooling period is followed by the step of polymerizing the acrylic monomer. To facilitate polymerization the polymerization inhibitor is preferably eliminated from the reaction mixture during the cooling period. The decomposition of the polymerization inhibitor, particularly the alkaline nitrite, may be carried out with any type of compound generating free radicals, as for example peroxides, persulfates or other strong oxidants, or compounds quantitatively reacting with the nitrites, such as aminosulfonic acid. However, the decomposing agent selected for use in the subject process will preferably thermally decompose at temperatures encountered during the cooling period and will yield free radicals that react with the inhibitor. Since the majority of the polymerization inhibitor is present in the aqueous phase, the decomposing agent should be water soluble. Nevertheless, because compounds generating free radicals are also polymerization initiators, the decomposing agent should be substantially insoluble in the organic phase in order to limit the initiation of the polymerization reaction.

Examples of suitable decomposing agents for use as polymerization inhibitors include ammonium persulfate, potassium persulfate, and aminosulfonic acid.

The temperature at which the decomposing agent is introduced into the reaction mixture depends on the agent used. These agents are preferably introduced in sufficiently high amounts to completely eliminate the polymerization inhibitor. Generally these compounds are used in excess of the stoichiometric amount. However, an amount higher than seven times this stoichiometric amount could initiate an unwanted polymerization reaction during this cooling step. A satisfactory amount generally ranges from about 500 to about 800 ppm based on the water present in the reaction mixture. According to the process of the invention, when the temperature ranges between about 80° and about 100° C., and preferably between about 85° and 95° C., the polymerization catalyst is simultaneously added to the suspension mixture with from about 20 to about 50% of the monomer capable of crosslinking the rubbery copolymer. In the scope of the present invention, said monomers are selected from the conjugated diolefins, and a particularly preferred one is butadiene. The introduction of the monomer is carried out continuously over a period ranging from about ½ to about 2 hours. After that period of time, the rest of the monomer capable of crosslinking the rubbery copolymer is continuously added in the reactor mixture over a period ranging from about 4 to about 10 hours. Thereafter the polymerization is achieved in suspension up to completion according usual operating conditions. Such operating conditions are described in the U.S. patent application Ser. No. 24,837 filed on Mar. 28, 1979, which is a continuation-in-part of patent application Ser. No. 916,576 filed on June 19, 1978, which is a continuation-in-part of patent application Ser. No. 890,211 filed on Mar. 28, 1978, all of which are incorporated herein by reference.

The following examples are given in order to better illustrate the present invention but without limiting it.

EXAMPLE 1

1,545 g of beads of a styrene-acrylonitrile copolymer (73% styrene-27% acrylonitrile) were suspended in a reactor containing 2,592 g water, 22.3 g hydroxyapatite as suspending agent and 5.79 g of sodium 2-ethylhexylsulfate as surfactive agent. The oxygen present in the reactor was eliminated by steam venting. The suspension was then heated to a temperature of 120° C. Before introducing the acrylic monomer, 0.52 g of $NaNO_2$ as polymerization inhibitor of the acrylic monomer was injected into the suspension at 120° C. After this injection, 2-ethylhexyl acrylate already containing 100 ppm of MEHQ as polymerization inhibitor was continuously added at a rate of 130.7 ml/hr over 4 hours at 120° C. The amount of $NaNO_2$ introduced in the suspension represented 1100 ppm based on the acrylic monomer. During this period of 4 hours the acrylic monomer was absorbed by the styrene-acrylonitrile copolymer. After this period of time, the suspension was progressively cooled to a temperature of 90° C. When the temperature was 100° C. during this cooling period, 2.2 g of potassium persulfate as decomposition agent for the polymerization inhibitor were injected into the suspension. The amount of 2-ethylhexyl acrylate present in the form of monomer after the absorption period was determined by analyzing the volatile products. This amount was 22.63% while the theoretical value is 23.08%.

By way of comparison, the same experiment was repeated, but without adding either $NaNO_2$ or the decomposition agent. The amount of 2-ethylhexyl acrylate present in the form of monomer was 16.09%. This result shows that a considerable part of the monomer was polymerized.

EXAMPLE 2

The experiment described in Example 1 was repeated, but by using different proportions of polymerization inhibitor and different decomposition agents of the polymerization inhibitor.

| Experiment | MEHQ (ppm) | Inhibitor Type | Inhibitor Weight (g) | Decomposition agent Type | Decomposition agent Weight (g) | 2-ethylhexyl acrylate monomer Present (%) | 2-ethylhexyl acrylate monomer Theorical (%) |
|---|---|---|---|---|---|---|---|
| 1 | 100 | $NaNO_2$ | 1.04 | $K_2S_2O_8$ | 4.4 | 21.14 | 23.08 |
| 2 | 100 | $NaNO_2$ | 0.52 | $H_2NSO_3H$ | 2.6 | 21.5 | 23.08 |
| 3 | 25 | $NaNO_2$ | 1.56 | $H_2NSO_3H$ | 2.6 | 21.7 | 23.08 |
| 4 | 100 | $NaNO_2$ | 0.52 | $(NH_4)_2S_2O_8$ | 3.7 | 21.8 | 23.08 |

In experiment 4, $(NH_4)_2S_2O_8$ was introduced into the suspension at 105° C.

This example shows that the polymerization of the acrylic monomer can be avoided during the absorption period, by using the inhibitor/decomposition agent system of the invention.

EXAMPLE 3

58,000 g of beads of a styrene-acrylonitrile copolymer (73% styrene-27% acrylonitrile) were suspended in a 50 gallon reactor containing 94,300 g water, 837.5 g of hydroxyapatite as suspending agent and 215.4 g of sodium 2-ethylhexylsulfate as surfactive agent. The oxygen present in the reactor was eliminating by steam venting. The suspension was then heated to 120° C. Before introducing the acrylic monomer, 9.4 g of $NaNO_2$ were injected into the suspension at a temperature of 120° C. After this injection, 2-ethylhexylacrylate already containing 100 ppm MEHQ as polymerization inhibitor, was continuously added at a rate of 4,905 ml/hr over 4 hours at 120° C. The amount of $NaNO_2$ introduced into the suspension represented 550 ppm, based on the acrylic monomer. During this 4 hour period, the acrylic monomer was absorbed by the styrene-acrylonitrile copolymer. After this 4 hour period, the suspension was progressively cooled to a temperature of 90° C. When the temperature was 105° C., during this cooling period, 48.8 g of ammonium persulfate as decomposition agent for the polymerization inhibitor, were injected into the suspension. After the absorption step and the cooling period, 94.4 g of tert-butyl perbenzoate as polymerization catalyst and butadiene at a rate of 3,000 ml/hr over 1 hour were simultaneously added to the suspension, at a temperature of 90° C. Thereafter, the suspension was heated to 102° C. and the rest of butadiene was continuously introduced into the suspension at a rate of 1,126 ml/hr over 8 hours. After this period, the suspension was heated to 130° C. and maintained at that temperature for 2 hours. Finally the suspension was heated to 135° C. and maintained at that temperature for 2 hours.

When polymerization was complete, the copolymer beads were washed, centrifuged and dried, and thereafter the styrene-acrylonitrile-ethylhexyl acrylate-butadiene copolymer was extruded in the presence of 0.15% by weight, based on the copolymer, of 2,6 ditert-butyl-4-methylphenol as antioxidant. Before beginning the polymerization step, the amount of 2-ethylhexyl acrylate present in the form of monomer was determined. This amount was 22.02% with regard to 23.08% which is the theoretical value.

The properties of the resin obtained are indicated below:

| | | | |
|---|---|---|---|
| Melt flow index | 0.88 g/10 min | Elongation | 75% |
| Vicat | 103.0° C. | Bends | 52 |
| Izod | 8.0 ft lb/inch | Amount of Diels-Adler addition product | 1.98% |
| Falling dart | 120 inch.lb | | |
| Tensile strength | 4,600 psi. | | |
| Tensile modulus | $2.26 \times 10^5$ psi | | |

EXAMPLE 4

103 kg of beads of a styrene-acrylonitrile copolymer (73% styrene-27% acrylonitrile) were suspended in a 100 gallon reactor containing 173 kg water, 1,518 g of hydroxyapatite as suspending agent and 383 g of sodium 2-ethylhexylsulfate as surfactive agent. The oxygen present in the reactor was eliminating by steam venting. The suspension was then heated to 120° C., 4,32 g of $NaNO_2$ were then injected into the suspension. After this injection, 2-ethylhexyl acrylate already containing 100 ppm of MEHQ was continuously added into the suspension at a temperature of 120° C. and at rate of 7,728 g/hr over 4 hours. The amount of NaNO$_2$ introduced represents 140 ppm, based on the acrylic monomer. During this 4 hour period, the acrylic monomer was absorbed by the styrene-acrylonitrile copolymer. After this 4 hour period, the suspension was progressively cooled to a temperature of 90° C. When the temperature was 105° C. during this cooling period, 242 g of ammonium persulfate, as decomposition agent for the polymerization inhibitor, were injected into the suspension. After this absorption step and the cooling period, 88.3 g of tert-butyl perbenzoate as polymerization catalyst and butadiene, at a rate of 3,312 g/hr over 1 hour, were simultaneously added to the suspension, at a temperature of 90° C. Thereafter the suspension was heated to 120° C. and the rest of the butadiene was continuously introduced into the suspension at a rate of 1,242 g/hr over 8 hours. When this addition was terminated, the suspension was maintained at 102° C. for 2 hours. The suspension was then heated to 130° C. and maintained at that temperature for 2 hours. Finally, the suspension was heated to 135° C. and maintained at that temperature during 2 hours. When polymerization was complete, the copolymer beads were washed, centrifuged and dried, and thereafter the styrene-acrylonitrile-ethyl-hexyl acrylate-butadiene copolymer was extruded in the presence of 0.15% by weight, based on the copolymer, of 2,6 di tert-butyl-4-methyl-phenol as antioxidant. Before beginning the polymerization step, the amount of 2-ethylhexyl acrylate present in the form of monomer was determined. This amount was 22.7% as compared to 23.08% which is the theoretical value. The properties of the obtained resin are indicated in Table II below.

By way of comparison, the experiment described above was repeated, but without adding either the polymerization inhibitor or the decomposition agent for the polymerization inhibitor. During this comparative experiment and before beginning the polymerization step, the amount of 2-ethylhexyl acrylate present in the form of monomer was 9.4% as compared to 23.8% which is the theoretical value. However, polymerization was carried out as described above and the properties of the resin obtained were indicated in Table II.

TABLE II

|  | Melt flow index (g/10 min) | Vicat (°C.) | Izod (ft/lb/inch) | Falling Dart (inch.lb) | Tensile strength (psi) | Tensile Modulus (psi) | Elongation (%) | Bends | Adduct (%) |
|---|---|---|---|---|---|---|---|---|---|
| Resin of example 4 | 10.2 | 103.3 | 5.32 | 100 | 3895 | 2.42 × 10$^5$ | 22 | 43 | 1.9 |
| Comparative resin | 7.5 | 105.3 | 2.18 | 44 | 4750 | 2.36 × 10$^5$ | 9 | 17 | 0.8 |

What we claim is:

1. A process for preparing rubber reinforced styrenic resins wherein the rubbery copolymer is formed in situ by suspension polymerization, which comprises the steps of
   introducing into a suspension of styrenic resin beads, under an oxygen free atmosphere, a polymerization inhibitor for the acrylic monomer, said inhibitor easily generating nitrogen oxides,
   introducing into said suspension an acrylic monomer, carrying out the absorption of the acrylic monomer by the styrenic resin, at a temperature ranging from about 110° to about 130° C., over a period of time sufficient to obtain a homogeneous distribution of the monomer in the styrenic resin,
   cooling the said suspension to a temperature ranging between about 80° and about 100° C.,
   introducing into said suspension, during the cooling period, a decomposing agent of the polymerization inhibitor of the acrylic monomer,
   introducing into said suspension, after the cooling period, a free radical polymerization catalyst together with from about 20 to about 50% of a monomer capable of cross-linking the rubbery polymer, said introduction being carried out over a period of time ranging from about ½ to about 2 hours,
   introducing into said suspension the rest of the monomer capable of crosslinking the rubbery polymer, said introduction being carried out over a period from about 4 to about 10 hours,
   completing the suspension polymerization.

2. A process according to claim 1 wherein the polymerization inhibitor for the acrylic monomer is selected from the group comprising hydroxylamine, NO and alkaline nitrite.

3. A process according to claim 1 or 2, wherein the polymerization inhibitor for the acrylic monomer is sodium nitrite.

4. A process according to claim 1 or 2 wherein the polymerization inhibitor is used in an amount corresponding from about 100 to about 1500 ppm by weight, based on the acrylic monomer present in the suspension.

5. A process according to claim 1, wherein the acrylic monomer is an alkyl ester of acrylic acid whose alkyl radical has at least 6 carbon atoms.

6. A process according to claim 5 wherein the acrylic monomer is 2-ethylhexyl acrylate.

7. A process according to claim 1 wherein the acrylic monomer is used in an amount comprised between 20 and 40% by weight based on the styrenic resin.

8. A process according to claim 1 wherein the decomposing agent of the polymerization inhibitor is a water soluble compound capable of generating free radicals.

9. A process according to claim 8, wherein the decomposing agent for the polymerization inhibitor has an active thermal decomposition at temperatures ranging between about 90° and about 110° C.

10. A process according to claim 8, wherein the decomposing agent for the polymerization inhibitor is selected from the group comprising peroxides, persulfate, strong oxidants, and compounds quantitively reacting with alkaline nitrite.

11. A process according to claim 10, wherein the decomposing agent for the polymerization inhibitor is preferably selected from the group comprising ammonium persulfate, potassium persulfate and aminosulfonic acid.

12. A process according to claim 8, wherein the decomposing agent for the polymerization inhibitor is used in an amount ranging from about 500 to about 800 ppm by weight, based on the water present in the suspension mixture.

13. A process according to claim 1 wherein the monomer capable of cross-linking the rubbery copolymer is a conjugated diolefin.

14. A process according to claim 13 wherein the monomer capable of cross-linking the rubbery copolymer is butadiene.

15. The product made by the process of claims 1, 2, 3, 4, 5, 6, 7, 8, 9, 10, 11, 12, 13 or 14.

* * * * *